United States Patent
Feng

(10) Patent No.: US 10,423,041 B2
(45) Date of Patent: Sep. 24, 2019

(54) ARRAY SUBSTRATE AND LIQUID CRYSTAL DISPLAY PANEL

(71) Applicant: Shenzhen China Star Optoelectronics Technology Co., Ltd., Shenzhen, Guangdong (CN)

(72) Inventor: Tuo Feng, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 2 days.

(21) Appl. No.: 15/540,942

(22) PCT Filed: Apr. 20, 2017

(86) PCT No.: PCT/CN2017/081234
§ 371 (c)(1),
(2) Date: Jun. 29, 2017

(87) PCT Pub. No.: WO2018/170983
PCT Pub. Date: Sep. 27, 2018

(65) Prior Publication Data
US 2018/0275444 A1   Sep. 27, 2018

(30) Foreign Application Priority Data
Mar. 23, 2017   (CN) .......................... 2017 1 0178211

(51) Int. Cl.
*G02F 1/136*   (2006.01)
*G09G 3/36*   (2006.01)
*G02F 1/1362*   (2006.01)
*G02F 1/1343*   (2006.01)
*G02F 1/1335*   (2006.01)

(52) U.S. Cl.
CPC .... *G02F 1/13624* (2013.01); *G02F 1/136227* (2013.01); *G02F 1/136286* (2013.01); *G02F 1/133514* (2013.01); *G02F 1/134309* (2013.01); *G02F 2001/134345* (2013.01); *G02F 2201/121* (2013.01)

(58) Field of Classification Search
CPC ....................................................... G02F 1/136
See application file for complete search history.

(56) References Cited

U.S. PATENT DOCUMENTS

2007/0064164 A1   3/2007   Tasaka et al.
2008/0174712 A1   7/2008   Kim et al.
(Continued)

*Primary Examiner* — Moazzam Hossain
*Assistant Examiner* — Omar F Mojaddedi
(74) *Attorney, Agent, or Firm* — Andrew C. Cheng

(57) ABSTRACT

The present invention discloses an array substrate and a liquid crystal display panel. Each pixel region is connected correspondingly to a data line and two gate line, and each pixel region comprises three sub-pixel electrodes and three switching elements, wherein the first switching element is connected to the first gate line, the first sub-pixel electrode, and the data line, the second switching element is connected to the first gate line, the second sub-pixel electrode and the data line, and the third switching element is connected to the second gate line, a second sub-pixel electrode, and a third sub-pixel electrode. By the above-mentioned technical solution, the present invention can improve the color shift phenomenon when in a large viewing angle and increase the display quality.

3 Claims, 2 Drawing Sheets

(56) References Cited

U.S. PATENT DOCUMENTS

| | | | |
|---|---|---|---|
| 2008/0273131 A1* | 11/2008 | Kim | .................... G02F 1/13624 349/38 |
| 2009/0153759 A1* | 6/2009 | Um | ...................... G09G 3/3651 349/39 |
| 2012/0147282 A1* | 6/2012 | Shin | .................... G02F 1/13624 349/38 |
| 2015/0002561 A1 | 1/2015 | Yao et al. | |
| 2015/0022510 A1 | 1/2015 | Tasaka et al. | |
| 2017/0140714 A1 | 5/2017 | Han et al. | |

* cited by examiner

ARRAY SUBSTRATE AND LIQUID CRYSTAL DISPLAY PANEL

FIELD OF THE INVENTION

The present invention relates to a technology of display, and more particularly, to an array substrate and a liquid crystal display panel.

DESCRIPTION OF PRIOR ART

Liquid Crystal Display (LCD) as a commonly used display device comprises two relative substrates arranged separately and a liquid crystal layer filled therebetween. The LCD generates an electric field by applying a voltage to pixel electrode and common electrode on the two substrates, and the electric field controls liquid crystal molecules to deflect and combine the polarization of the incident light to display an image.

In current, vertical alignment (VA) mode LCD stands out because of its high contrast ratio, large viewing angle and other advantages. However, in order to make the quality of the side view close to the front view, one pixel of the VA panel is usually divided into two sub-pixels, and the gray levels of the two sub-pixels are different, it results in a difference in the light transmission rate between the two areas, so the color shift phenomenon will appear in a large viewing angle and the display quality will be affected.

SUMMARY OF THE INVENTION

In view of the above, the present invention provides an array substrate and a liquid crystal display panel, it is possible to improve the color shift phenomenon when in a large viewing angle and increase the display quality.

An embodiment of the present invention provides an array substrate, which comprises a plurality of pixel regions, wherein each pixel region is connected correspondingly to a data line, a first gate line and a second gate line; the first gate line and the second gate line are arranged separately and are perpendicular to the data line, each pixel region comprises: a first sub-pixel electrode, a second sub-pixel electrode, and a third sub-pixel electrode are arranged between the first gate line and the second gate line, and which are separately and sequentially arranged along the extension direction of the data line, wherein the area of the first sub-pixel electrode is larger than the area of the second sub-pixel electrode or the third sub-pixel electrode; a first thin film transistor, and a gate, a drain, and a source of the first thin film transistor are connected respectively to the first gate line, the first sub-pixel electrode, and the data line; a second thin film transistor, and a gate, a drain, and a source of the second thin film transistor are connected respectively to the first gate line, the second sub-pixel electrode, and the data line; a third thin film transistor, and a gate, a drain, and a source of the third thin film transistor are connected respectively to the second gate line, the second sub-pixel electrode, and the third sub-pixel electrode.

An embodiment of the present invention provides an array substrate, which comprises a plurality of pixel regions, wherein each pixel region is connected correspondingly to a data line, a first gate line and a second gate line; the first gate line and the second gate line are arranged separately and are perpendicular to the data line, each pixel region comprises: a first sub-pixel electrode, a second sub-pixel electrode, and a third sub-pixel electrode are arranged between the first gate line and the second gate line, and which are separately and sequentially arranged along the extension direction of the data line; a first switching element is connected to the first gate line, the first sub-pixel electrode, and the data line; a second switching element is connected to the first gate line, the second sub-pixel electrode, and the data line; a third switching element is connected to the second gate line, the second sub-pixel electrode, and the third sub-pixel electrode.

An embodiment of the present invention provides a liquid crystal display panel, which comprises a common electrode and a plurality of pixel regions, wherein each pixel region is connected correspondingly to a data line, a first gate line and a second gate line; the first gate line and the second gate line are arranged separately and are perpendicular to the data line, each pixel region comprises: a first sub-pixel electrode, a second sub-pixel electrode, and a third sub-pixel electrode are arranged between the first gate line and the second gate line, and which are separately and sequentially arranged along the extension direction of the data line; a first switching element is connected to the first gate line, the first sub-pixel electrode, and the data line; a second switching element is connected to the first gate line, the second sub-pixel electrode, and the data line; a third switching element is connected to one of the second sub-pixel electrode and the common electrode; the third switching element is connected respectively to the second gate line, and the third sub-pixel electrode.

By the above-mentioned technical solutions, in the embodiment of the present invention, when a gate drive signal is applied to the first gate line, the first switching element and the second switching element are turned on, the first sub-pixel electrode and the second sub-pixel electrode receive the grayscale voltage, when the gate drive signal is applied to the second gate line, the first switching element and the second switching element are turned off and the third switching element is turned on, the liquid crystal capacitance having the second sub-pixel electrode is discharged to the liquid crystal capacitor having the third sub-pixel electrode to achieve voltage rebalance between the two sub-pixels of the two liquid crystal capacitors, thereby a voltage difference is generated between the three sub-pixels so that the light transmission rates in regions where the three sub-pixels in are different, the color shift phenomenon when in a large viewing angle can be improved and the display quality can be increased by controlling the voltage difference between the three sub-pixels

DESCRIPTION OF PREFERRED EMBODIMENT

Technical implementation will be described below clearly and fully by combining with drawings made in accordance with an embodiment in the present invention. In the case of non-collision, the following embodiments and their technical features may be combined with each other.

Figure 1:
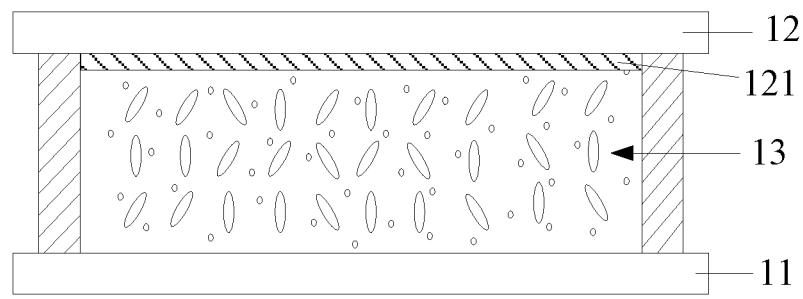
FIG. 1 is a cross sectional view of the liquid crystal display panel made in accordance with the embodiment in the present invention.

Referring to FIG. 1, FIG. 1 is a cross sectional view of the liquid crystal display panel made in accordance with the embodiment in the present invention. Liquid crystal display panel 10 comprises two relative array substrates (also known as thin film transistor substrate) 11 arranged separately, a color filter (CF) substrate 12, and liquid crystals (liquid crystal molecules) 13 filled between the two substrates. The liquid crystals 13 are in the liquid crystal cell in which the array substrate 11 and the color film substrate 12 are overlapped.

Wherein, a common electrode 121 is arranged on the color film substrate 12, which may be a transparent conductive film, such as an indium tin oxide (ITO) thin film. The array substrate 11 comprises a transparent substrate, and various wiring and pixel electrodes arranged on the transparent substrate. Specifically, the array substrate 11 comprises a plurality of data lines arranged in the column direction, a plurality of gate lines arranged in the row direction, and a plurality of pixel regions defined by the plurality of gate lines and the plurality of data lines. Because of the structure of the plurality of pixel regions is the same, the present embodiment will be described below with one of the pixel regions as an example.

Figure 2:
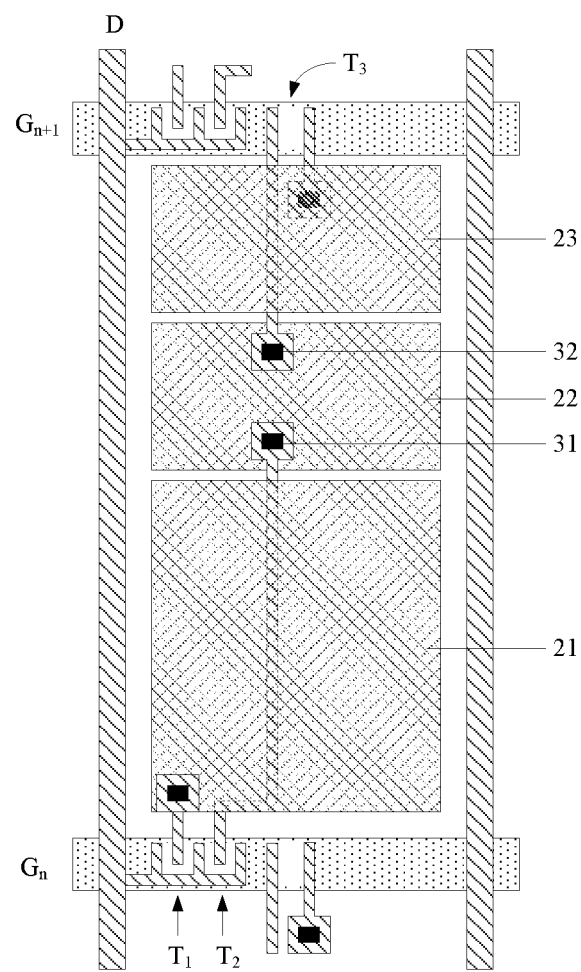
FIG. 2 is a structural illustration of a pixel region of the liquid crystal display panel shown in FIG. 1.
Figure 3:
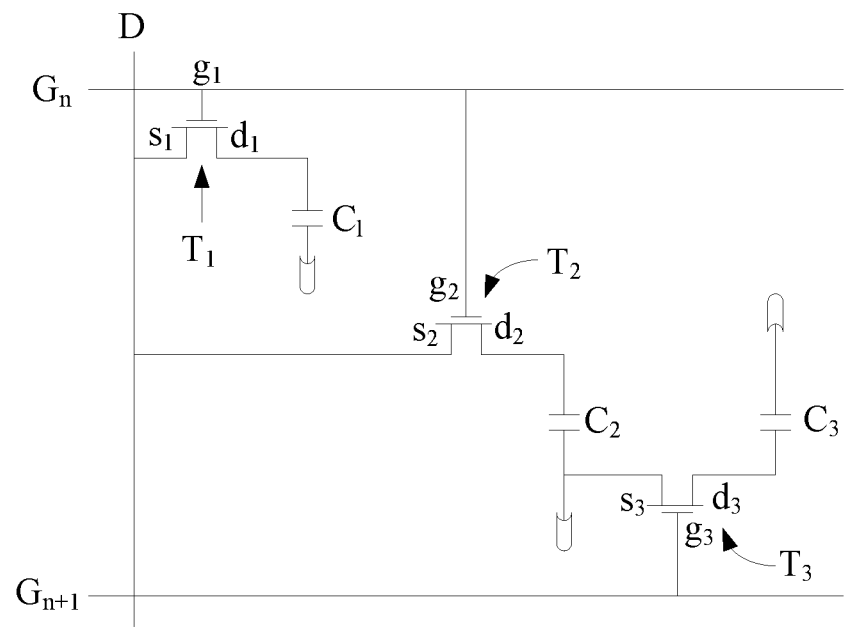
FIG. 3 is an equivalent circuit diagram of the pixel region shown in FIG. 2.

As shown in FIG. 2 and FIG. 3, each of the pixel regions 20 is connected to a data line D and two adjacent gate lines correspondingly, e.g. The first gate line $G_n$ at the nth row and the second gate line $G_{n+1}$ at the n+1th row as shown in figure. Each of the pixel regions 20 comprises a first sub-pixel electrode 21, a second sub-pixel electrode 22, a third sub-pixel electrode 23, a first switching element $T_1$, a second switching element $T_2$, and a third switching element $T_3$.

Wherein the first sub-pixel electrode 21, the second sub-pixel electrode 22, and the third sub-pixel electrode 23 are arranged in a predetermined direction sequentially, the predetermined direction is a direction paralleled to the data line D and a direction from the first gate line $G_n$ toward the second gate line $G_{n+1}$. The three sub-pixel electrodes 21, 22, and 23 may be treated as three sub-pixels of one pixel region 20, and each sub-pixel is a 4-domain structure, so that each pixel region 20 is a 12-domain structure. In addition, the first sub-pixel electrode 21 may be a main-pixel of the pixel region, and the second sub-pixel electrode 22 and the third sub-pixel electrode 23 as a sub-pixel of the pixel region. At this time, the area of the first sub-pixel electrode 21 is larger than the area of any one of the second sub-pixel electrode 22 and the third sub-pixel electrode 23.

The first switching element $T_1$ is connected to the first gate line $G_n$, the first sub-pixel electrode 21, and the data line D. The second switching element $T_2$ is connected to the first gate line $G_n$, the second sub-pixel electrode 22, and the data line D. The third switching element $T_3$ is connected to the second gate line $G_{n+1}$, the second sub-pixel electrode 22, and the third sub-pixel electrode 23. In the practical application scenario, the first switching element $T_1$, the second switching element $T_2$, and the third switching element $T_3$ may be made of thin film transistor (TFT) and which are used to charge three sub-pixels, respectively. Specifically, the gate $g_1$ of the first switching element $T_1$ is connected to the first gate line $G_n$, the drain $d_1$ of the first switching element $T_1$ is connected to the first sub-pixel electrode 21, and the source $s_1$ of the first switching element $T_1$ is connected to the data line D. The gate $g_2$ of the second switching element $T_2$ is connected to the first gate line $G_n$, the drain $d_2$ of the second switching element $T_2$ is connected to the second sub-pixel electrode 22, and the source $s_2$ of the second switching element $T_2$ is connected to the data line D. The gate $g_3$ of the third switching element $T_3$ is connected to the second gate line $G_{n+1}$, the drain $d_3$ of the third switching element $T_3$ is connected to the third sub-pixel electrode 23, the source $s_3$ of the third switching element $T_3$ is connected to the second sub-pixel electrode 22 is connected.

In the equivalent circuit diagram of the pixel structure of the liquid crystal display panel 10, as shown in FIG. 3, a first liquid crystal capacitance $C_{1c}$ is formed by the first sub-pixel electrode 21, the common electrode 121, and the liquid crystal 13 located therebetween, a second liquid crystal capacitance $C_{2c}$ is formed by the second sub-pixel electrode 22, the common electrode 121, and the liquid crystal 13 located therebetween, a third liquid crystal capacitance $C_{3c}$ is formed by the third sub-pixel electrode 23, the common electrode 121, and the liquid crystal 13 located therebetween. When the liquid crystal display panel 10 is displayed, when the first gate line $G_n$ is applied with a gate drive signal, the first switching element $T_1$ and the second switching element $T_2$ are turned on, and the first sub-pixel electrode 21 and the second sub-pixel electrode 22 receive a grayscale voltage (gray scale signal) from the data line D; when the gate drive signal is applied to the second gate line $G_{n+1}$, the first switching element $T_1$ and the second switching element $T_2$ are turned off, and the third switching element $T_3$ is turned on. At this time, the second liquid crystal capacitance $C_{2c}$ having the second sub-pixel electrode 22 is discharged to the third liquid crystal capacitor $C_3$, having the third sub-pixel electrode 23 to achieve voltage rebalance between the two sub-pixels corresponding to the second liquid crystal capacitance $C_{2c}$ and the third liquid crystal capacitor $C_{3c}$, thereby a voltage difference is generated between the three sub-pixels so that the light transmission rates in regions where the three sub-pixels in are different, the color shift phenomenon when in a large viewing angle can be improved and the display quality can be increased by controlling the voltage difference between the three sub-pixels In the present embodiment, the three sub-pixels are connected to the corresponding switching elements via through holes respectively to receive the grayscale voltage from the data line D. In the prior art, two sub-pixels are arranged in a pixel area of the VA panel, the difference in present embodiment is that one of the sub-pixels is divided into two sub-pixels, so that the pixel aperture ratio is not changed, but a sub-pixel is added. Based on this, the present embodiment adds two through holes, such as a first through hole 31 and a second through hole 32, as shown in FIG. 2, wherein the first through hole 31 is used to connect to the second sub-pixel electrode 22 and a drain $d_2$ of second switching element $T_2$, the second through hole 32 is used to connect to the third sub-pixel electrode 23 and a source $s_3$ of third switching element $T_3$.

In the manufacturing process of the liquid crystal display panel 10, the first through hole 31 and the second through hole 32 may be arranged in different layer structures. Of course, the first through hole 31 and the second through hole 32 may also be arranged on the same layer structure of the array substrate 11 to simplify the manufacturing process, e.g., both of which are arranged on the insulating layer between the second sub-pixel electrode 22 and the drain $d_2$ of the second switching element $T_2$. As for the through holes that are connected between the other sub-pixels and the corresponding switching elements, the present embodiment can be referred to manufacturing process of the prior art, therefore no additional description is given herebelow.

Figure 4:
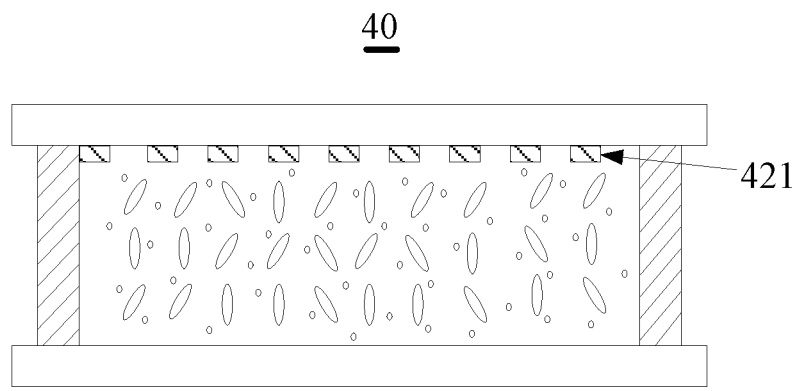
FIG. 4 is a cross sectional view of the liquid crystal display panel made in accordance with the further embodiment in the present invention.

FIG. 4 is a cross sectional view of the liquid crystal display panel made in accordance with the further embodiment in the present invention, the embodiment is based on the description of the embodiment shown in FIG. 1, but is different from that a common electrode 421 of a liquid crystal display panel 40 of the present embodiment may include a plurality of strip structures arranged separately. Further, in a direction perpendicular to the line of sight of the liquid crystal display panel 40, the first sub-pixel electrode, the second sub-pixel electrode, and the third sub-pixel electrode are overlapped respectively with one of the stripe structures, so that a first liquid crystal capacitance is formed by the first sub-pixel electrode, the common electrode 421, and the liquid crystal located therebetween, a second liquid crystal capacitance is formed by the second sub-pixel electrode, the common electrode 421, and the liquid crystal located therebetween, a third liquid crystal capacitance is formed by the third sub-pixel electrode, the common electrode 421, and the liquid crystal located therebetween. When the liquid crystal display panel 40 is displayed, the second liquid crystal capacitor can still discharge to the third liquid crystal capacitor to achieve voltage rebalance between the two sub-pixels corresponding to the second liquid crystal capacitance and the third liquid crystal capacitor, finally, the color shift phenomenon when in a large viewing angle can be improved and the display quality can be increased.

In addition, alternatively, the source of the third switching element may be connected to the common electrode 421 instead of the second sub-pixel electrode. Thus, the embodiment of the present invention can also achieve that the second liquid crystal capacitor is discharged to the third liquid crystal capacitor, thereby achieving the above-mentioned purpose of the present invention.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. An array substrate comprising a plurality of pixel regions, wherein each pixel region is connected correspondingly to a data line, a first gate line and a second gate line; the first gate line and the second gate line are arranged separately and are perpendicular to the data line, each pixel region comprises:
   a first sub-pixel electrode, a second sub-pixel electrode, and a third sub-pixel electrode are arranged between the first gate line and the second gate line, and which are separately and sequentially arranged along the extension direction of the data line;
   a first switching element is connected to the first gate line, the first sub-pixel electrode, and the data line;
   a second switching element is connected to the first gate line, the second sub-pixel electrode, and the data line;
   a third switching element is connected to the second gate line, the second sub-pixel electrode, and the third sub-pixel electrode;
   wherein each the first switching element, the second switching element, and the third switching element comprises a thin film transistor; a gate, a drain, and a source of the first switching element are connected respectively to the first gate line, the first sub-pixel electrode, and the data line; a gate, a drain, and a source of the second switching element are connected respectively to the first gate line, the second sub-pixel electrode; and the data line; a gate, a drain, and a source of the third switching element are connected respectively to the second gate line, the second sub-pixel electrode, and the third sub-pixel electrode.

2. The array substrate as recited in claim 1, wherein the area of the first sub-pixel electrode is larger than the area of the second sub-pixel electrode or the third sub-pixel electrode.

3. The array substrate as recited in claim 1, wherein the array substrate further comprises a first through hole and a second through hole located in the pixel region; the first through hole is used to connect to the drain of second switching element and the second sub-pixel electrode, the second through hole is used to connect to the source of third switching element and the third sub-pixel electrode, wherein the first through hole and the second through hole are arranged in the same layer structure of the array substrate.

* * * * *